United States Patent
Piel et al.

(10) Patent No.: US 9,200,136 B2
(45) Date of Patent: Dec. 1, 2015

(54) CHLORINE DIOXIDE RESISTANT POLYETHYLENE PIPES, THEIR PREPARATION AND USE

(75) Inventors: Tanja Piel, Linz Österreich (AT); Martin Anker, Hisings Kärra (SE); Jeroen Oderkerk, Stenungsund (SE); Per-Ola Hagstrand, Stenungsund (SE)

(73) Assignee: Borealis AG, Vienna (AT)

(*) Notice: Subject to any disclaimer, the term of this patent is extended or adjusted under 35 U.S.C. 154(b) by 592 days.

(21) Appl. No.: 13/320,373

(22) PCT Filed: Jun. 21, 2010

(86) PCT No.: PCT/EP2010/058706
§ 371 (c)(1),
(2), (4) Date: Jan. 24, 2012

(87) PCT Pub. No.: WO2010/149607
PCT Pub. Date: Dec. 29, 2010

(65) Prior Publication Data
US 2012/0118390 A1 May 17, 2012

(30) Foreign Application Priority Data
Jun. 22, 2009 (EP) .................................. 09163328

(51) Int. Cl.
*C08K 5/00* (2006.01)
*C08L 23/08* (2006.01)
(Continued)

(52) U.S. Cl.
CPC ........... *C08K 5/0008* (2013.01); *C08L 23/0815* (2013.01); *F16L 9/12* (2013.01); *B29C 47/0004* (2013.01); *B29C 47/0023* (2013.01);
(Continued)

(58) Field of Classification Search
CPC B29C 47/0004; B29C 47/0023; B29C 47/20; B29C 47/903; C02F 1/76; C02F 2103/30; C02F 2103/34; C02F 2303/04; C02F 2303/14; C02F 2307/14; C08K 5/0008; C08L 23/04; C08L 23/06; C08L 23/0815
See application file for complete search history.

(56) References Cited

U.S. PATENT DOCUMENTS 3,646,155 A 2/1972 Scott et al.
4,297,310 A 10/1981 Akutsu et al.
(Continued)

FOREIGN PATENT DOCUMENTS

EP 0 169 070 A2 1/1986
EP 0 295 811 B1 1/1992
(Continued)

OTHER PUBLICATIONS

Ciba Specialty Chem. et al., "EPA High Production Volume Program Test Plan for IRGANOX 1330 / ETHANOX 330" (2006).*
(Continued)

*Primary Examiner* — Lucas Stelling
(74) *Attorney, Agent, or Firm* — Fay Sharpe LLP

(57) ABSTRACT

The present invention deals with the use of pipes made of cross-linked polyethylene for transporting water containing chlorine dioxide. Cross-linked polyethylene has a resistance of more than 3500 hours against water treated with chlorine dioxide when tested according to a modified method of ASTM F2263-03. Especially, the pipes made of cross-linked polyethylene can be used for transporting drinking water which had been disinfected by using chlorine dioxide.

17 Claims, 1 Drawing Sheet

• 0 h, ○ 2 h, ■ 28 h, □ 140 h, ▲ 500 h, △ 1133 h and ▼ 1594 h.

(51) Int. Cl.
*F16L 9/12* (2006.01)
*C02F 1/76* (2006.01)
*C02F 103/30* (2006.01)
*C02F 103/34* (2006.01)
*B29C 47/00* (2006.01)
*B29C 47/20* (2006.01)
*B29C 47/90* (2006.01)
*C08L 23/06* (2006.01)

(52) U.S. Cl.
CPC .............. *B29C 47/20* (2013.01); *B29C 47/903* (2013.01); *C02F 1/76* (2013.01); *C02F 2103/30* (2013.01); *C02F 2103/34* (2013.01); *C08L 23/06* (2013.01); *C08L 2203/18* (2013.01); *C08L 2205/02* (2013.01); *C08L 2205/03* (2013.01); *Y10T 137/0318* (2015.04)

(56) References Cited

U.S. PATENT DOCUMENTS

| | | | |
|---|---|---|---|
| 4,297,310 | B1 | 7/1989 | Akutsu et al. |
| 5,167,777 | A * | 12/1992 | Kaczur et al. ............... 205/633 |
| 5,175,032 | A * | 12/1992 | Steele et al. ............... 428/34.9 |
| 5,196,270 | A * | 3/1993 | Kitagawa et al. ........... 428/523 |
| 5,972,267 | A | 10/1999 | Kharazi et al. |
| 6,136,926 | A * | 10/2000 | Raetzsch et al. ............ 525/254 |
| 6,455,616 | B1 | 9/2002 | Cogen |
| 6,645,411 | B2 | 11/2003 | Dänekas et al. |
| 7,086,421 | B2 | 8/2006 | Backman et al. |
| 2002/0125196 | A1* | 9/2002 | Rosenblatt et al. .......... 210/721 |
| 2002/0193027 | A1* | 12/2002 | Dana et al. .................... 442/285 |
| 2004/0224150 | A1* | 11/2004 | Hiramatsu et al. ........... 428/343 |
| 2006/0128930 | A1* | 6/2006 | Dhawan et al. ............... 528/86 |
| 2008/0057313 | A1* | 3/2008 | Bicakci-Jenkins et al. ... 428/413 |
| 2009/0069477 | A1* | 3/2009 | Vogt et al. .................... 524/378 |

FOREIGN PATENT DOCUMENTS

| | | |
|---|---|---|
| EP | 1 146 078 A1 | 10/2001 |
| EP | 1 146 079 A1 | 10/2001 |
| EP | 1 256 593 A1 | 11/2002 |
| EP | 1 460 105 A1 | 9/2004 |
| EP | 1 911 799 A1 | 4/2008 |
| EP | 1 695 992 B1 | 1/2010 |
| GB | 1 357 549 | 6/1974 |
| GB | 2 028 831 A | 3/1980 |
| GB | 2 039 513 A | 8/1980 |
| WO | WO 93/08222 | 4/1993 |
| WO | WO 96/18677 | 6/1996 |
| WO | WO 97/10936 | 3/1997 |
| WO | WO 00/01765 | 1/2000 |
| WO | WO 00/22040 | 4/2000 |
| WO | WO 03/087197 | 10/2003 |
| WO | WO 2004/010040 A1 | 1/2004 |
| WO | WO 2005/056657 A2 | 6/2005 |

OTHER PUBLICATIONS

International Search Report mailed Oct. 29, 2010 for International Application No. PCT/EP2010/058706.

Written Opinion mailed Oct. 29, 2010 for International Application No. PCT/EP2010/058706.

International Preliminary Report on Patentability mailed Sep. 26, 2011 for International Application No. PCT/EP2010/058706.

Correspondence (relating to the Demand of the International Preliminary Examination and Written Opinion) to the European Patent Office dated Apr. 20, 2011 for International Application No. PCT/EP2010/058706.

Carollo Engineers Technical Memorandum, "Evaluating the Compatibility of Chemical Disinfectants with Plastic Pipe Materials Used for Potable Water Distribution", Aug. 2008.

Chung et al., "An Examination of the Relative Impact of Common Potable Water Disinfectants (Chlorine, Chloramines and Chlorine Dioxide) on Plastic Piping System Components", Antec, 2007, pp. 2940-2944.

Chung et al., "The Mechanisms of Chlorine Dioxide Oxidation of Plastic Piping Systems", Jana Laboratories, Inc., Aurora, Ontario, Canada, 2008.

Magali Rosental, "A Reliable Bench Testing for Benchmarking Oxidation Resistance of Polyethylene in Disinfected Water Environments", Plastic Pipes 2008—Session 3B, Budapest, Sep. 23, 2008.

Yu et al., "Deterioration of Polyethylene Pipes Exposed to Water Containing Chlorine Dioxide", *Polymer Degradation and Stability*, 96, 2011, Elsevier Ltd., pp. 790-797.

* cited by examiner

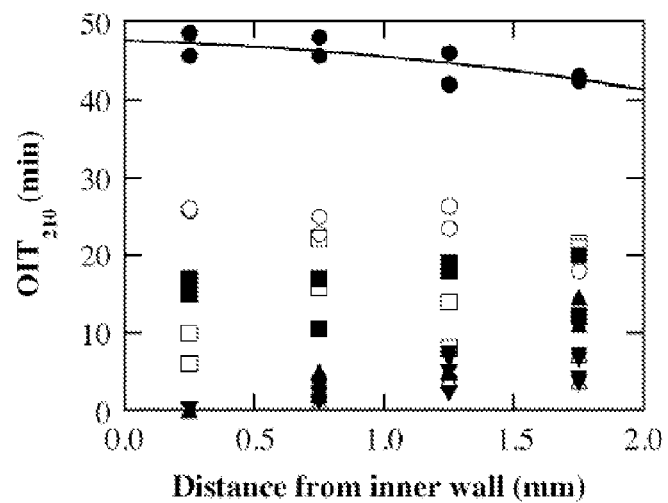
Figure 1: ● *0 h,* ○ *2 h,* ■ *28 h,* □ *140 h,* ▲ *500 h,* △ *1433 h and* ▼ *1594 h.*
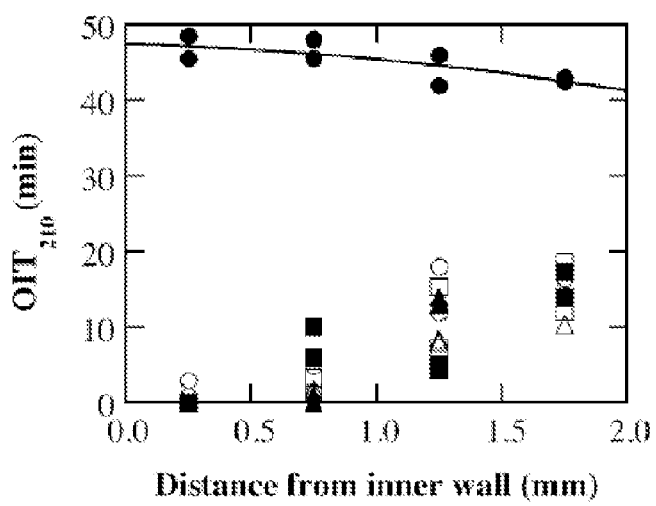
Figure 2: ● *0 h,* ○ *2 h,* ■ *21 h,* □ *79 h,* ▲ *118 h and* △ *121 h.*

CHLORINE DIOXIDE RESISTANT POLYETHYLENE PIPES, THEIR PREPARATION AND USE

OBJECTIVE OF THE INVENTION

The present invention provides for pipes made of a polymer composition which is resistant to chlorine dioxide. Especially the present invention provides pipes made of the ethylene polymer composition having improved resistance to chlorine dioxide.

TECHNICAL FIELD

EP-A-1911799 discloses stabilized polyethylene materials having improved resistance against $ClO_2$-containing water.

WO-A-2005/056657 discloses stabilized polyethylene materials having improved chlorine resistance.

U.S. Pat. No. 7,086,421 discloses flexible multilayer tubing having an outer layer of cross-linked polyethylene and inner layer of HDPE. The polymer of the inner layer had a higher density than that of the outer layer.

WO-A-2004/010040 discloses pipes made of cross-linked PE containing less than 2% carbon black and which has an improved chlorine resistance.

Chlorine dioxide, $ClO_2$, is sometimes used as a disinfectant in water, for instance, instead of chlorine. Hence, chlorine dioxide-containing water is in permanent contact with the pipe material. Due to the permanent contact to the inner pipe surface, deterioration of the polyolefin composition is caused. While it has been found that the presence of chlorine accelerates the failure of pipes the effect of $ClO_2$ is much more pronounced. Therefore, even if a pipe had a good resistance against chlorine-containing water it does not necessarily mean that such pipe would have a good resistance against $ClO_2$-containing water.

It has been found that antioxidants used in polyolefin compositions for pipes known to provide a good resistance to chlorinated water do not necessarily provide satisfactory resistance against chlorine dioxide-containing water. A further important issue as regards the presence of antioxidants in polyolefin compositions is the aim to avoid contamination of media transported e.g. in a pipe made of such a polyolefin composition. This is particularly important in case of a pipe transporting drinking water. Generally speaking, it is preferred to use as low concentrations of antioxidant as possible in order to lower the amount of antioxidant which may possibly be extracted by the water transported in the pipe.

SUMMARY OF THE INVENTION

The present invention provides pipes having improved resistance against chlorine dioxide, which pipes are made of compositions comprising cross-linked ethylene polymer.

As seen from one aspect the present invention offers a use of a pipe comprising a layer forming an inner pipe surface defining a flow path for a fluid within said pipe for transporting water into which chlorine dioxide has been added wherein said layer consists of a composition comprising from 60 to 100% by weight of cross-linked polyethylene.

As seen from another aspect the present invention provides a method of transporting water at elevated pressure of from 1.5 to 10 bar(a) from a water delivery station to at least one consumer station through at least one pipeline connecting said delivery station to said consumer station, said pipeline comprising a number of pipe elements having an inner surface and an outer surface wherein said inner surface defines a flow path for water, said method comprising the steps of:
disinfecting water by dosing chlorine dioxide into the water in an amount of from 0.01 ppm to 4 ppm by weight of $ClO_2$ in water;
establishing a flow of the disinfected water from said delivery station to said at least one consumer station through said pipeline,
characterized in that at least one pipe element in said pipeline has an internal layer which is in contact with water disinfected by chlorine dioxide and which comprises from 60 to 100% of cross-linked polyethylene.

DESCRIPTION OF THE FIGURES

FIG. 1 shows the oxidative induction time of a (non-crosslinked) polyethylene material at different distances from the pipe surface after different treatment times of chlorine-containing water at 90° C.

FIG. 2 shows the oxidative induction time of a (non-crosslinked) polyethylene material at different distances from the pipe surface after different treatment times of chlorine dioxide-containing water at 90° C.

DETAILED DESCRIPTION

Unless otherwise stated all fractions (such as %, ‰, ppm, etc.) in this document refer to weight basis. Thus, for instance, 1 ppm of $ClO_2$ in water means that 1 kg of water (including any components dissolved therein) contains 1 mg $ClO_2$.

Cross-linkable Ethylene Polymer

The composition comprises a cross-linked ethylene polymer. The cross-linked ethylene polymer is produced by cross-linking a cross-linkable ethylene polymer. Said cross-linkable ethylene polymer can be an ethylene homopolymer or a copolymer of ethylene. It has density of from 925 to 965 $kg/m^3$. It also has either a melt index $MFR_5$ of from 0.5 to 15 g/10 min, preferably from 1 to 10 g/10 min, or a melt index $MFR_2$ of from 0.1 to 10 g/10 min, preferably from 0.5 to 5 g/10 min. The cross-linkable ethylene polymer is present in the composition in an amount of from 60 to 100%, preferably from 70 to 100%, such as from 70 to 98% by weight.

According to one preferred embodiment of the invention the cross-linkable ethylene polymer is a copolymer of ethylene comprising from 95 to 99.9% by mole of ethylene units and from 0.1 to 5% by mole of vinylsilane units. Suitable vinylsilane comonomers are those having the formula:

$$RSiR'_nY_{3-n} \qquad (1)$$

Where R is an ethylenically unsaturated hydrocarbyl, hydrocarbyloxy or (meth)acryloxy hydrocarbyl group, R' is an aliphatic saturated hydrocarbyl group, Y which may be the same or different is a hydrolysable organic group, and n is 0, 1 or 2.

Preferably Y is an alkoxy group of an alkyl having from 1 to 6 carbon atoms, such as methoxy, ethoxy, propoxy and butoxy.

Preferably, the cross-linkable ethylene polymer contains from 0.1 to 2% by mole of vinylsilane units, more preferably from 0.2 to 1% by mole and from 98 to 99.9% by mole of ethylene units, more preferably from 99.8 to 99% by mole.

In the formula (1) above R may be suitably vinyl, allyl, isoprenyl, butenyl, cyclohexyl or γ-(meth)acryloxy propyl; Y is suitably methoxy, ethoxy, formyloxy, acetoxy, propionyloxy, or an alkylamino or arylamino group; and R', if present, is suitably a methyl, ethyl, propyl, decyl or phenyl group. A specifically preferred group of compounds is

$$CH_2=CHSi(OA)_3 \quad (2)$$

Where A is a hydrocarbyl group having 1 to 8 carbon atoms, preferably 1 to 4 carbon atoms.

The most preferred compounds are vinyl trimethoxy silane, vinyl triethoxy silane, γ-(meth)acryloxy propyltrimethoxysilane, and vinyl triacetoxy silane and combinations thereof.

The copolymer of ethylene and vinyl silane copolymer may be produced by graft copolymerisation. Such graft copolymerisation may be conducted by a suitable method known in the art, such as by adding the base polymer, the graft comonomer and peroxide into an extruder and extruding the polymer into pellets. Such procedure is disclosed, among others, in EP-A-295811, U.S. Pat. No. 3,646,155 and GB-A-1357549. For example, according to such a method 100 parts per weight of base polymer, which is an ethylene homo- or copolymer, is mixed with from 0.5 to 25 parts per weight, preferably from 0.5 to 10 parts per weight, of the vinylsilane comonomer and from 0.02 to 0.5 parts per weight of an organic peroxide.

The base polymer mentioned above may be a homopolymer of ethylene or a copolymer of ethylene with one or more alpha-olefins and/or non-conjugated dienes. Furthermore, the base polymer may be a high density polyethylene, a linear low density polyethylene, a low density polyethylene produced in a high-pressure process or a medium density polyethylene. The graft copolymer preferably has a density of from 935 to 965 kg/m$^3$, more preferably from 945 to 965 kg/m$^3$ and in particular from 950 to 964 kg/m$^3$. Further, the graft copolymer preferably has a melt index MFR$_5$ of from 0.5 to 15 g/10 min, more preferably from 0.5 to 10 g/10 min and especially preferably from 1 to 10 g/10 min.

However, it is also possible to produce the copolymer of vinyl silane and ethylene directly in the reactor, as disclosed in GB-A-2028831 and U.S. Pat. No. 4,297,310. For example, ethylene, propylene (as a chain transfer agent) and vinyltrimethoxysilane can be polymerised by using t-butylperoxyisobutyrate initiator at a temperature of about 240° C. and a pressure of about 2500 bar. Such in-reactor copolymerized polymer preferably has a density of from 925 to 945 kg/m$^3$, more preferably from 925 to 935 kg/m$^3$. Furthermore, it preferably has a melt index MFR$_2$ of from 0.1 to 10 g/10 min, more preferably from 0.5 to 7 g/10 min and in particular from 0.5 to 5 g/10 min.

The cross-linkable ethylene copolymer may then be cross-linked by using a suitable catalyst to produce a cross-linked polymer composition. For example, the silane grafted copolymer can be cross-linked by using water and a silanol condensation catalyst. Suitable silanol condensation catalysts are, for instance dihydrocarbyl tin(IV) carboxylate compounds, such as dioctyltindilaureate, dibutyltin(IV)maleate and dibutyltindilaureate, as disclosed in EP-A-169070. Furthermore, a phosphorous or antimony compound as disclosed in EP-A-169070 may also be used in combination. Alternative suitable condensation catalysts are those comprising a sulphonic group having a formula ArSO$_3$H, where Ar is a hydrocarbyl-substituted aromatic group. Such compounds are disclosed in EP-A-1256593.

Cross-linking of the cross-linkable composition according to this embodiment is then achieved by treating the composition comprising the polymer and the catalyst in the presence of water, water vapour or steam. This is preferably done at elevated temperatures, such as between 40 and 110° C. However, by choosing a suitable catalyst it is also possible to conduct the cross-linking at ambient conditions, as disclosed in EP-A-1256593.

According to another preferred embodiment of the invention the cross-linkable ethylene polymer is a copolymer of ethylene, comprising from 93 to 99.9% by mole of ethylene units, from 0 to 7% by mole of units derived from alpha-olefins having from 4 to 10 carbon atoms and from 0.1 to 7% by mole of units derived from polyene compounds. Such a polyene compound is preferably an α,ω-diene, such as 1,7-octadiene, 1,9-decadiene, 1,11-dodecadiene and 7-methyl-1,6-octadiene, as described in EP-A-1695992 and WO-A-93/08222. Such copolymer preferably has a density of from 920 to 965 kg/m$^3$, such as 920 to 945 kg/m$^3$, more preferably from 925 to 935 kg/m$^3$. Further, the copolymer preferably has a melt index MFR$_2$ of from 0.1 to 10 g/10 min, more preferably from 0.5 to 7 g/10 min and in particular from 0.5 to 5 g/10 min.

Such cross-linkable polymer is typically cross-linked by using a peroxide initiator. Then the untreated polymer and the peroxide are first mixed together. One suitable method is to impregnate the polymer powder or the polymer pellets with the peroxide as disclosed, among others, in U.S. Pat. Nos. 5,972,267, 6,455,616 or 6,645,411. The mixture is then heated to a temperature which is above the decomposition temperature of the peroxide. Suitable peroxides that may be used are, for instance, dicumyl peroxide, benzoyl peroxide, dichlorobenzoyl peroxide, di-tert-butylperoxide, 2,5-dimethyl-2,5-di(peroxybenzoate), hexyne-3,1,4-bis(tert-butylperoxyisopropyl)benzene, lauroyl peroxide, tert-butyl peracetate, tert-butyl perbenzoate, 2,5-dimethyl-2,5-di(tert-butylperoxy)hexane, 2,5-dimethyl-2,5-di(tert-butylperoxy)hexyne and tert-butylperphenyl acetate.

Alternatively, the polymer may also be cross-linked by radiation cross-linking as known in the art. Thus, gamma radiation, UV radiation or electron beam radiation may be used to cross-link the polymer.

According to one more preferred embodiment of the invention the cross-linkable ethylene polymer is a homo- or copolymer of ethylene containing terminal double bonds. Such polymer containing terminal double bonds may be produced by polymerising ethylene in the presence of certain catalysts, such as chromium catalysts or specific metallocene catalysts. Also this type of polymer can be cross-linked by using peroxide or radiation as described above.

Ethylene Polymer

In addition to the cross-linkable ethylene polymer the composition may contain also another ethylene polymer. The ethylene polymer is a homopolymer of ethylene or a copolymer of ethylene and one or more alpha-olefin comonomers having from 4 to 10 carbon atoms. It has a density of from 925 to 965 kg/m$^3$. It also has an MFR$_2$ of from 0.01 to 10 g/10 min. It may be present up to the amount of 40% by weight, preferably up to the amount of 30% by weight.

The ethylene polymer may be produced by any suitable method known in the art. Thus, it may be produced by polymerising ethylene and optionally alpha-olefin comonomers in the presence of a Ziegler-Natta catalyst. It is also possible to conduct the polymerisation in the presence of a chromium catalyst. Furthermore, a metallocene catalyst may also be used to produce the ethylene polymer. The polymerisation may be conducted at a pressure of from 1 to 100 bar and at a temperature of from 50 to 110° C. Hydrogen may be used to control the molecular weight as is known in the art.

According to one embodiment of the invention the ethylene polymer is a multimodal ethylene polymer that may be used for making pipes similar to those disclosed in WO-A-1996/18677, WO-A-2000/01765 or WO-A-2000/022040. It preferably has a density of from 935 to 965 kg/m$^3$ and more preferably from 940 to 955 kg/m³. Moreover, it preferably has an MFR₅ of from 0.1 to 1 g/10 min, more preferably from 0.15 to 0.65 g/10 min.

According to another embodiment of the invention the ethylene polymer is a unimodal ethylene polymer which has a density of from 940 to 965 kg/m³ and MFR₂ of from 0.5 to 10 g/10 min. Such ethylene polymer is preferably produced by polymerizing ethylene and optionally alpha-olefins having fro 4 to 10 carbon atoms in the presence of a Ziegler-Natta catalyst comprising titanium, magnesium, aluminium and chlorine as essential constituents. Alternatively, such polymers are produced by polymerizing ethylene and optionally alpha-olefins having fro 4 to 10 carbon atoms in the presence of a single site catalyst comprising a transition metal compound of titanium, zirconium or hafnium having a ligand comprising a cyclopentadienyl, indenyl, tetrahydroindenyl, fluorenyl or octahydrofluorenyl structure.

Other Components

The polymer composition may contain additives and other polymers as known in the art. Thus, it may contain e.g. a prepolymer, or a carrier polymer of a masterbatch or similar. The amount of such other polymers can be chosen freely as long as they do not negatively influence the properties of the polymer composition. Thus, a suitable amount of such other polymers is up to 20%, such as from 0 to 15%, preferably from 0 to 10% and in particular from 0 to 7% by weight of the polymer composition.

The additives are used in the amount known in the art. Examples of suitable additives are antioxidants, stabilizers, pigments, UV screeners and UV stabilizers, lubrication agents, antistatic agents and like.

Suitable antioxidants and stabilizers are, for instance, sterically hindered phenols, phosphites or phosphonites, sulphur containing antioxidants, alkyl radical scavengers, aromatic amines, hindered amine stabilizers and the blends containing compounds from two or more of the above-mentioned groups. They are used in an amount of 500 to 10000 ppm per weight of the polymer. Traditionally pipes made of crosslinked polyethylene have been used in conveying hot water having a temperature of from about 40 to 90° C. and then the content of antioxidants and stabilizers has been from about 4000 to 9000 ppm. However, a high amount of stabilizers is not desired in drinking water pipes because they or their degradation products may migrate into the water causing offensive taste or odour. The present inventors have now found that when the pipes are used for conveying drinking water which has been disinfected by ClO₂ a sufficient stabilization is achieved even if the amount antioxidants and stabilizers is significantly reduced. The inventors have found that good stabilization without taste and odour problems is obtained when the content of the antioxidants and the stabilizers is from 500 to 3500 ppm and preferably from 1000 to 3000 ppm.

Examples of sterically hindered phenols are, among others, 2,6-di-tert-butyl-4-methyl phenol (sold, e.g., by Degussa under a trade name of lonol CP; CAS No. 128-37-0), pentaerythrityl-tetrakis(3-(3',5'-di-tert. butyl-4-hydroxyphenyl)-propionate (sold, e.g., by Ciba Specialty Chemicals under the trade name of Irganox 1010; CAS No. 6683-19-8) octadecyl-3-(3'S'-di-tert-butyl-4'-hydroxyphenyl)propionate (sold, e.g., by Ciba Specialty Chemicals under the trade name of Irganox 1076; CAS No. 2082-79-3), 1,3,5-tri-methyl-2,4,6-tris-(3,5-di-tert. butyl-4-hydroxyphenyl)benzene (sold, e.g., by Ciba Specialty Chemicals under the trade name of Irganox 1330; CAS No. 1709-70-2), 2,5,7,8-tetramethyl-2(4',8',12'-trimethyltridecyl)chroman-6-ol (sold, e.g., by BASF under the trade name of Alpha-Tocopherol and by Ciba Specialty Chemicals under the trade name of Irganox E 201; CAS No. 10191-41-0), Calcium (3,5-di-tert. butyl-4-hydroxy benzyl monoethyl-phosphonate) (sold, e.g., by Ciba Specialty Chemicals under the trade name of Irganox 1425; CAS No. 65140-91-2), 1,3,5-Tris(3',5'-di-tert. butyl-4'-hydroxybenzyl)-isocyanurate (sold, e.g., by Ciba Specialty Chemicals under the trade name of Irganox 3114; CAS No. 27676-62-6), Bis-(3,3-bis-(4-'-hydroxy-3'-tert. butylphenyl)butanic acid)-glycolester (sold by Clariant under the trade name of Hostanox O3; CAS No. 32509-66-3), 4,4'-Thiobis (2-tert. butyl-5-methylphenol) (sold, e.g., by Ciba Specialty Chemicals under the trade name of Irganox 415; CAS No. 96-69-5), 2,2'-metilene-bis(6-(1-methyl-cyclohexyl) para-cresol) (sold by Chemtura under trade name of Lowinox WSP; CAS No. 77-62-3), N,N'-hexamethylene bis(3,5-di-tert. butyl-4-hydroxy-hydrocinnamamide (sold, e.g., by Ciba Specialty Chemicals under the trade name of Irganox 1098; CAS No. 23128-74-7), 1,1,3-Tris (2-methyl-4-hydroxy-5-tert. butylphenyl) butane (sold, e.g., by Chemtura under trade name of Lowinox CA22; CAS No. 1843-03-4) and 1,3,5-Tris (4-tert. butyl-3-hydroxy-2,6-dimethylbenzyl)-1,3,5-triazine-2,4,6-(1H,3H,5H)-trione (sold, e.g., by Chemtura under trade name of Lowinox 1790; CAS No. 40601-76-1).

Especially preferably the phenolic antioxidant has the formula:

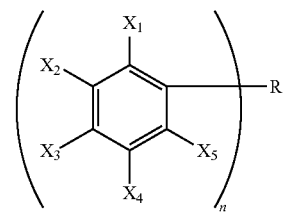

Where R is a non-substituted or substituted aliphatic or aromatic hydrocarbyl radical which may comprise heteroatoms, or R is a heteroatom; $X_1$, $X_2$, $X_3$, $X_4$ and $X_5$ is independently H, OH or R'; whereby R' is a non-substituted or substituted aliphatic or aromatic hydrocarbyl radical which may comprise heteroatoms; and n is 1 to 4. Especially preferably at least one of the substituents R or R' contains a heteroatom selected from sulphur, phosphorous and nitrogen. Examples of this kind of compounds are 2,2'-thiodiethylene-bis-(3,5,di-t-butyl-4-hydroxyphenyl)propionate (sold by Ciba Specialty Chemicals under the trade name of Irganox 1035; CAS No. 41484-35-9), 4,4'-thio-bis-(2-t-butyl-5-methylphenol) (sold by Chemtura under trade name of Lowinox TBM-6; CAS No. 96-69-5), diethyl((3,5-bis-(1,1-dimethylethyl)-4-hydroxyphenyl)methyl)phosphonate (sold by Ciba Specialty Chemicals under the trade name of Irganox 1222; CAS No. 976-56-7) and N,N'-bis-(3-(3',5'-di-t-butyl-4'-hydroxyphenyl)propionyl)hydrazine (sold by Ciba Specialty Chemicals under the trade name of Irganox MD 1024; CAS No. 33687-78-8).

Examples of phosphites and phosphonites are tris (2,4-di-t-butylphenyl) phosphite (sold, e.g., by Ciba Specialty Chemicals under the trade name of Irgafos 168; CAS No. 31570-04-4), tetrakis-(2,4-di-t-butylphenyl)-4,4'-biphenylen-di-phosphonite (sold, e.g., by Ciba Specialty Chemicals under the trade name of Irgafos P-EPQ; CAS No. 38613-77-3) and tris-(nonylphenyl)phosphite (sold, e.g., by Dover Chemical under the trade name of Doverphos HiPure 4; CAS No. 26523-78-4).

Examples of sulphur-containing antioxidants are dilaurylthiodipropionate (sold, e.g., by Ciba Specialty Chemicals under the trade name of Irganox PS 800; CAS No. 123-28-4), ditridecylthiodipropionate (sold by Reagens under the trade name of Arenox DT, CAS No. 10595-72-9), dimyristylthiodipropionate (sold by Sumitomo Chemical under the trade name of Sumilzer TPM, CAS No. 16545-54-3), dioctadecyldisulphide (sold by Clariant under the trade name of Hostanox SE10, CAS No. 2500-88-1), bis[2-methyl-4-(3-n-dodecylthiopropionyloxy)-5-tert-butylphenyl]sulfide (sold by Adeka Corporation under the trade name of ADK STAB AO-23, CAS No. 66534-05-2), pentaerythritol-tetrakis-(3-laurylthiopropionate) (sold by Adeka Corporation under the trade name of ADK STAB AO-412S, CAS No. 29598-76-3), 3,3'-thiobispropanoic acid dimethylester polymer with 1,4-cyclohexanedimethanol, octadecyl ester (sold by Eastman Chemical under the trade name of Eastman Inhibitor Poly TDP 2000, CAS No. 63123-11-5) and distearylthiodipropionate (sold, e.g., by Chemtura under the trade name of Lowinox DSTDP; CAS No. 693-36-7).

Examples of nitrogen-containing antioxidants are 4,4'-bis(1,1'-dimethylbenzyl)diphenylamine (sold, e.g., by Chemtura under the trade name of Naugard 445; CAS No. 10081-67-1), polymer of 2,2,4-trimethyl-1,2-dihydroquinoline (sold, e.g., by Chemtura under the trade name of Naugard EL-17; CAS No. 26780-96-1), p-(p-toluene-sulfonylamido)-diphenylamine (sold, e.g., by Chemtura under the trade name of Naugard SA; CAS No. 100-93-6), N,N'-diphenyl-p-phenylene-diamine (sold, e.g., by Chemtura under the trade name of Naugard J; CAS No. 74-31-7), N,N'-dinaphtyl-p-phenylene-diamine (sold by R. T. Vanderbilt under the trade name of AgeRite White, CAS No. 93-46-9) and p,p'-Dioctyl-diphenylamine (sold by R. T. Vanderbilt under the trade name of Vanox 12, CAS No. 101-67-7).

Commercially available blends of antioxidants and process stabilizers are also available, such as Irganox B225, Irganox B215 and Irganox B561 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium dioxide may be used as an UV-screener as well as a pigment.

Other suitable pigments are, for instance, blue pigments, such as Pigment Blue 29 (Ultramarine Blue, CAS No. 57455-37-5) and Pigment Blue 15:1 (Copper Phthalocyanine Blue, CAS No. 147-14-8).

Pipe Extrusion

Pipes according to the present invention are produced according to the methods known in the art from the polymer composition as described above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to still another method the extrudate leaving the die is directed into a tube having perforated section in the centre. A slight vacuum is drawn through the perforation to hold the pipe against the walls of the sizing chamber.

After the calibration the pipe is preferably cross-linked in a cross-linking unit. When peroxide is used for cross-linking the temperature is raised above the decomposition temperature of the peroxide which thus initiates the cross-linking. If silane cross-linking is used water or water vapour is contacted with the pipe to effect the cross-linking.

After the sizing the pipe is cooled, typically in a water bath having a length of about 5 metres or more.

The pipe extrusion and the cross-linking may be done successively or simultaneously. Preferably they are conducted successively and more preferably the polymer is first extruded into a pipe and then cross-linked, as described above.

Cross-linking

The aim of the cross-linking is to improve the resistance of the polymer against chlorine dioxide. Any suitable cross-linking method known in the art may be applied.

If the cross-linkable ethylene polymer is a copolymer of ethylene and vinylsilane it may then be cross-linked by treating the composition comprising the polymer and the silanol condensation catalyst at in the presence of water, water vapour or steam. This is preferably done at elevated temperatures, such as between 40 and 110° C. However, also lower temperature may be employed if the reduced cross-linking rate is compensated by allowing a longer time for the cross-linking to take place.

By using certain sulphonic acid catalysts the cross-linking may be conducted at ambient temperature in the presence of humid air. Such methods are disclosed more in detail in EP-A-1256593.

When the cross-linking is done by using peroxide the untreated polymer and the peroxide are first mixed together. One suitable method is to impregnate the polymer powder or the polymer pellets with a solution containing the peroxide. The mixture is then heated to a temperature which is above the decomposition temperature of the peroxide. Suitable peroxides that may be used are, for instance, dicumyl peroxide, benzoyl peroxide, dichlorobenzoyl peroxide, di-tert-butylperoxide, 2,5-dimethyl-2,5-di(peroxybenzoate), hexyne-3,1, 4-bis(tert-butylperoxyisopropyl)benzene, lauroyl peroxide, tert-butyl peracetate, tert-butyl perbenzoate, 2,5-dimethyl-2, 5-di(tert-butylperoxy)hexane, 2,5-dimethyl-2,5-di(tert-butylperoxy)hexyne and tert-butylperphenyl acetate.

Also radiation cross-linking may be used. The polymer composition is then radiated by using a suitable radiation to achieve cross-linking. Suitable examples of radiation are gamma radiation, UV radiation or electron beam radiation.

Suitable radiation doses may be, for instance, from 1 to 25 Mrad, preferably from 5 to 10 Mrad. Methods of irradiation cross-linking are known in the art and are disclosed, among others, in WO-A-1997/10936 and WO 2003/087199.

The resin is preferably cross-linked to a cross-linking degree of about 60% or higher.

Pipes and their Use

The present invention shows surprisingly that increased resistance to chlorine dioxide can be reached by using pipes where the layer which is in contact with water comprises cross-linked polyethylene. Such pipes have a long lifetime in $ClO_2$-resistance test. Furthermore, the pipes do not impart offensive taste and odour into the water. Preferably the pipes contain partially cross-linked polyethylene and they do not have a high level of stabilisation.

The difference in the effects of chlorine and chlorine dioxide is illustrated in FIGS. 1 and 2. They show how the oxidative induction time (OIT) is influenced at different distances from the pipe surface by the treatment time of chlorine and chlorine dioxide. The OIT is a rough measure on how long time it takes for oxidizing species to attack the polymer. For stabilized materials the oxidizing species first attack the stabilizers. When they are consumed they start attacking the polymer which then starts degrading. The OIT measures the time until the start of the degradation of the polymer. The longer the OIT the better the polymer composition is expected to withstand oxidative attack.

FIG. 1 shows the effect of the chlorine on the oxidative induction time of the pipe exposed to different times for water containing 4 ppm of chlorine at 90° C. It can be seen that after 2 minutes contact time the OIT at the inner pipe surface (being in contact with chlorine-containing water) was still about 20 to 25 minutes (hollow circles). After 28 hours in contact with chlorine-containing water the OIT at the pipe surface had dropped to about 15 to 18 minutes (solid squares) and a gradient in OIT vs. distance from the surface can be seen. The gradient becomes more pronounced after 140 hour treatment time (hollow squares) when the OIT at the surface drops to about 10 min. However, the OIT at the distance of 1.75 mm from the inner wall still is at the level of about 20 min. After 1433 hours treatment time the OIT at the surface falls to a value of 0 and a drop in the OIT at 1.75 mm distance can also be seen.

FIG. 2 shows the same effects when the treatment was done for the same resin with water containing 4 ppm of chlorine dioxide at 90° C. It can be seen that the OIT at the surface is 0 already after 2 hour treatment time and there is a clear gradient of the OIT vs. the distance from the surface. Furthermore, already after 120 hours the OIT even at the level of 1.75 mm is 15 minutes. For chlorine dioxide the depletion of antioxidants from the pipe surface is so rapid that the diffusion rate of the antioxidant from inside the pipe wall is not sufficient to maintain a level of antioxidant at the pipe surface. Therefore chlorine dioxide or its reaction products can almost immediately attack the polymer itself.

The present inventors have found that when the pipes are produced from cross-linked polyethylene the pipes have a good resistance against chlorine dioxide. This was surprising considering the very strong oxidative effect of chlorine dioxide.

An advantage of the present invention is that the pipes shall have a high resistance against chlorine dioxide even though the polyethylene composition contains a relatively low level of stabilizers. Thus, according to one embodiment the composition may contain in total at most 3500 ppm, preferably at most 3000 ppm of additives selected from the group consisting of sterically hindered phenols, phosphites and phosphonites, sulphur-containing antioxidants, nitrogen-containing antioxidants and mixtures thereof. In order to give a sufficient stabilization to the polymer the amount of such additives should preferably be at least 500 ppm and more preferably at least 1000 ppm. The advantage of using a low amount of additives is, in addition to the reduced cost of producing the composition, that the migration of the additives from the pipe into the water is reduced. Therefore such pipes can suitably be used as drinking water pipes. It is remarkable and completely unexpected that the cross-linking gives a protection against chlorine dioxide even with these low levels of stabilizer.

The pipes may be single-layered pipes or multi-layered pipes. If they are multi-layered pipes then at least the innermost layer which is in contact with the $ClO_2$-containing water comprises cross-linked polyethylene.

The outer layer(s) in multi-layered pipes can be made of any material known in the art. Thus, the outer layer(s) may be of steel, concrete or other polymeric materials, such as polyethylene or polypropylene. Especially preferably the outer layer(s) are other polyethylene materials, such as PE80, PE100 or even higher pressure rated polyethylene, such as PE112 or PE125. Such polyethylene materials are disclosed, for instance, in WO-A-1996/18677, WO-A-2000/01765, WO-A-2000/22040, EP-A-1146079, EP-A-1146078 and EP-A-1460105.

The pipes according to the present invention are useful in applications where drinking water which has been disinfected by adding chlorine dioxide into the water is transferred.

One example of a suitable use is drinking water pipes in water distribution networks where the water has been disinfected by dosing a small amount of $ClO_2$ into the water. Preferably the amount of $ClO_2$ dosed per amount of water is from 0.01 to 4 mg/kg, such as from 0.01 to 2 mg/kg, more preferably from 0.05 to 0.8 mg/kg. As the person skilled in the art knows $ClO_2$ is very reactive and is thus consumed during its passage through the pipe. The decomposition products may anyway still attack the pipe and lead to an early failure. It is therefore the initial dosing that is relevant for the lifetime of the pipe.

Such water distribution networks typically have a water delivery station and a number of consumer stations. The consumer stations are connected to the delivery station through at least one pipeline. Such pipeline contains pipe elements, such as pipe segments and fittings. The water into which $ClO_2$ is dosed is conducted from the delivery station to the consumer stations along the pipeline. It is preferred that at least some of the pipe elements are those according to the present invention containing cross-linked polyethylene.

Another area where the pipes according to the present invention are useful is chemical industry, such as pulp and paper industry, textile industry and printing industry. The pipes can be used to transport bleaching chemicals into the process or to remove the waste chemical solution therefrom.

As discussed above, the pipes made of the composition comprising cross-linked polyethylene have a long lifetime in the $ClO_2$-resistance test. Thus, 12 mm OD pipes with 2 mm wall thickness made from the composition have preferably a lifetime of at least 3500 hours, more preferably at least 5000 hours in the $ClO_2$-resistance test. Especially it has been found that even pipes having a low level of stabilization, such as from 500 to 3500 ppm of stabilizers, have a very good resistance against chlorine dioxide.

EXAMPLES

Methods

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Average Lifetime at 90° C., 1 ppm $ClO_2$

No standard exists yet for evaluating the resistance of pipes comprising a polyethylene composition to $ClO_2$-containing water. However, there is a standard for measuring the resistance to chlorinated water: ASTM F2263-03, "Standard test method for evaluating the oxidative resistance of Polyethylene (PE) pipe to chlorinated water". The lifetime of the pipes is tested accordingly with equipment according to ASTM F2263-03. However, $ClO_2$ is applied instead of chlorine ($Cl_2$, NaOCl).

A circulation loop is used for water which contains $ClO_2$. The concentration of $ClO_2$ in the water is 1.0±0.1 ppm. The pH of the water is 6.8±0.2. The temperature of the water is 90±1° C. The hoop stress applied to the pipe is about 1.7 MPa. The oxidation reduction potential (ORP) is 740 mV and is measured frequently. The flow volume is 23 l/h at a flow velocity of about 0.13 m/s and a fluid pressure of 6.5 bar. The free pipe length is 250 mm, the outer diameter of the pipe is 12 mm and the thickness of the wall is 2 mm. In the tests two pipes of each material are tested in series. Each pipe is tested until failure. The average of the two life time values is calculated.

The circulation loop used for $ClO_2$ testing is made from inert materials (e.g. titanium, PVDF (Polyvinylidene difluoride), PTFE (Polytetrafluoro ethylene) to avoid contamination of the test fluid. The fittings are of PVDF. The test fluid is continuously purified in three steps to avoid any contamination: 1. active carbon filter, 2. particle filter, 3. reverse osmosis. The internal environment is the above-mentioned solution of $ClO_2$ in water, the external environment is air.

The $ClO_2$ is generated directly at the site using a commercial $ClO_2$-generator from Prominent following the equation:

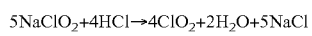

The mechanism for feeding the stock solutions ($NaClO_2$ and HCl) to the process is monitored to maintain a consistent ratio of chemicals.

All tests were carried out at Bodycote Polymer AB, Nyköping, Sweden.

Content of Alpha-olefin Comonomer Units in the Polymer

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 $cm^{-1}$. The comonomer used in the calibration samples was the same as the comonomer present in the samples. The analysis was performed by using the resolution of 2 $cm^{-1}$, wave number span of from 4000 to 400 $cm^{-1}$ and the number of sweeps of 128. At least two spectra were run from each film.

The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where $C_i$ is the comonomer content of the calibration sample i $A_{1378,i}$ is the absorbance at approximately 1378 $cm^{-1}$ of sample i $s_i$ is the thickness of the film made of calibration sample i k is the slope of the calibration line (obtained by regression analysis), and b is the intercept of the calibration line (obtained by regression analysis).

By using the thus obtained parameters k and b the comonomer content of the samples were obtained from $$C_x = k \cdot \frac{A_{1378,x}}{s_x} + b$$

where $C_x$ is the comonomer content of the unknown sample
$A_{1378,x}$ is the absorbance at approximately 1378 $cm^{-1}$ of the unknown sample $s_x$ is the thickness of the film made of the unknown sample k is the slope of the calibration line obtained from the calibration samples as above b is the intercept of the calibration line obtained from the calibration samples.

The method gives the comonomer content in weight-% or in mol-%, depending on which was used in the calibration. If properly calibrated, the same approach may also be used to determine the number of methyl groups, i.e., $CH_3$ per 1000 carbon atoms.

Content of Vinylsilane Units in the Polymer

The concentration of VTMS in the polymer is determined on a compression moulded film with thickness 50 to 120 µm by using the apparatus and general principles discussed above with the following differences. FTIR analysis was performed with resolution 4 $cm^{-1}$. The absorbance (peak height) for the peak at 1090 $cm^{-1}$ from silane was put in relation to the absorbance (peak height) at 2665 $cm^{-1}$ from the polyethylene backbone.

The content of vinylsilane units was thus obtained from the relation:

$$C_x = k \cdot \frac{A_{1090,x}}{A_{2665,x}} + b$$

where $C_x$ is the comonomer content of the unknown sample $A_{1090,x}$ is the absorbance at approximately 1090 $cm^{-1}$ with a horizontal base line through the minimum at 945 $cm^{-1}$ of the unknown sample $A_{2665,x}$ is the absorbance at approximately 2665 $cm^{-1}$ with a horizontal base line through the minimum at 2440 $cm^{-1}$ of the unknown sample k is the slope of the calibration line obtained from the calibration samples b is the intercept of the calibration line obtained from the calibration samples.

As known to the person skilled in the art the IR method needs to be calibrated for the proper concentration range of the specific comonomer by using the principles described above.

Content of Polyene Comonomer Units in the Polymer

Quantitative infrared (IR) spectroscopy was used to quantify the amount of carbon-carbon double bonds (C=C). Calibration was achieved by prior determination of the molar extinction coefficient of the C=C functional groups in representative low molecular weight model compounds of know structure.

The amount of each of these groups (N) was determined as number of carbon-carbon double bonds per thousand total carbon atoms (C=C/1000C) via:

$$N = (A \times 14)/(E \times L \times D),$$

where A is the maximum absorbance defined as peak height, E the molar extinction coefficient of the group in question ($l \cdot mol^{-1} \cdot mm^{-1}$), L the film thickness (mm) and D the density of the material ($g \cdot cm^{-3}$).

For polyethylenes with C=C containing comonomer the amount of C=C bonds originating solely from the comonomer was determined via their characteristic absorption and a reference material. The reference material was produced under comparable conditions to the material being analysed except for the lack of C=C containing comonomer. The amount of C=C bonds per thousand total carbon atoms originating from only the C=C containing comonomer was calculated through subtraction of N for the reference material from N for the polyethylene with C=C containing comonomer.

Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 $cm^{-1}$.

The molar extinction coefficient (E) was determined as $l \cdot mol^{-1} \cdot mm^{-1}$ via:

$$E = A/(C \times L)$$

where A is the maximum absorbance defined as peak height, C the concentration ($mol \cdot l^{-1}$) and L the cell thickness (mm).

At least three 0.18 $mol \cdot l^{-1}$ solutions in carbondisulphide ($CS_2$) were used and the mean value of the molar extinction coefficient used.

Cross-linking Degree

Cross-linking degree was determined according to ASTM D2765-01 method A by using decalin as solvent. The samples were taken from the cross-section of the pipe or pipe layer.

Pipe Extrusion

To measure the resistance against chlorine dioxide the composition was extruded into pipes having an outer diameter of 12 mm and a wall thickness of 2 mm in a Battenfeld extruder using a standard PE screw with a line speed of about 1 m/min. The extruder melt temperature was kept within a range of from 190 to 230° C. The extruded pipes were then cross-linked by using a suitable method to reach a cross-linking degree of about 65%.

Preparation Example 1

Production of the Base Polymer:

A loop reactor having a volume of 50 $dm^3$ was operated at a temperature of 60° C. and a pressure of 65 bar. Into the reactor were introduced 2 kg/h ethylene, 25 kg/h propane diluent and 12 g/h hydrogen. Also 2.5 g/h of a solid polymerisation catalyst component, which is sold by BASF under a trade name of Lynx 200™, was introduced into the reactor together with triethylaluminium cocatalyst so that the molar ratio of aluminium to titanium was 20. The polymer production rate was about 1 kg/h.

The slurry from the reactor was withdrawn intermittently and directed into a loop reactor having a volume of 500 $dm^3$ and which was operated at 95° C. temperature and 60 bar pressure. Into the reactor was further added 60 kg/h of propane and ethylene and hydrogen so that the ethylene content in the reaction mixture was 4.2 mol-% and the molar ratio of hydrogen to ethylene was 520 mol/kmol. The production rate of ethylene homopolymer having a melt index $MFR_2$ of 280 g/10 min was 35 kg/h.

The slurry was withdrawn from the loop reactor intermittently by using settling legs and directed to a flash vessel operated at a temperature of 50° C. and a pressure of 3 bar. From there the polymer was directed to a gas phase reactor operated at a pressure of 20 bar and a temperature of 85° C. Additional ethylene, 1-butene comonomer, nitrogen as inert gas and hydrogen were added so that the ethylene content in the reaction mixture was 20 mol-%, the ratio of hydrogen to ethylene was 27 mol/kmol and the ratio of 1-butene to ethylene was 180 mol/kmol. The polymer production rate in the gas phase reactor was 41 kg/h and thus the total polymer withdrawal rate from the gas phase reactor was 77 kg/h. The polymer had a melt index $MFR_5$ of 0.59 g/10 min and a density of 941 kg/m$^3$. The production split (% LMW component/% HMW component) was 47/53.

The polymer was mixed with 1500 ppm Ca-stearate, 1600 ppm of Irganox 1330 and 250 ppm of Irganox E201. In addition 5.75% by weight of a carbon black masterbatch containing 39.5% of carbon black was added to the polymer. The masterbatch did not contain further additives. The content of carbon black in the polymer was thus 2.25%. The complete formulation is shown in Table 2. Then it was compounded and extruded to pellets by using a CIMP90 extruder so that the SEI was 0.221 kWh/kg and the melt temperature 258° C.

Polymer data is shown in Table 1. This polymer is referred to as Polymer 1 in the subsequent discussion.

Preparation Example 2

The procedure of Example 1 was repeated except that a higher concentration of Irganox 1330 was used. This polymer is referred to as Polymer 2 in the subsequent discussion.

Preparation Example 3

The polymerization was conducted according to Example 1 of GB-A-2039513 except that the reactor was a tubular reactor operated at a temperature of 240° C. and pressure of 2500 bar. Into the reactor ethylene, a free radical initiator and vinyltrimethoxysilane in an amount of 600 g/h as a comonomer were continuously added. The resulting copolymer had a density of 930 kg/m$^3$, an $MFR_2$ of 2.0 g/10 min and a content of silane monomer units of 3.0% by weight (0.74% by mole).

This polymer is referred to as Polymer 3 in the subsequent discussion.

Preparation Example 4

The procedure of Example 1 of U.S. Pat. No. 3,646,155 was followed except that the base polymer was a copolymer of ethylene with 1-butene having a density of 964 kg/m$^3$ and $MFR_2$ of 8 g/10 min and which had been produced by polymerising ethylene in the presence of a Ziegler-Natta catalyst and that the amount of vinyltrimethoxysilane was 2.3 parts per weight per 100 parts per polymer. The resulting polymer had a density of 958 kg/m$^3$, an $MFR_2$ of 2 g/10 min and a content of vinyltrimethoxysilane units in the polymer of 2.0% by weight (0.49% by mole).

This polymer is referred to as Polymer 4 in the subsequent discussion.

Preparation Example 5

Into a gas phase reactor, operated at a temperature of 100° C. and a pressure of 10 bar were introduced ethylene, 1-butene and a Ziegler-Natta polymerization catalyst containing titanium and magnesium together with triethylaluminium cocatalyst. The resulting copolymer had a density of 954 kg/m$^3$ and a melt index $MFR_2$ of 4 g/10 min.

This polymer is referred to as Polymer 5 in the subsequent discussion.

Preparation Example 6

The procedure of Preparation Example 5 was repeated except that the conditions were changed so that the resulting polymer had a density of 964 kg/m$^3$ and a melt index $MFR_2$ of 8 g/10 min.

This polymer is referred to as Polymer 6 in the subsequent discussion.

Example 1 (Comparative)

Pipes 12×2 mm (outer diameter×wall thickness) were prepared from Polymer 1 by extrusion in a Battenfeld 45-25B extruder, which gave an output of 15 kg/h at a screw speed of 20 rpm. The extruder melt temperature was 214° C. and the melt pressure 137 bar. The resistance of the pipe against $ClO_2$-containing water was measured as discussed above.

Example 2 (Comparative)

The procedure of Example 1 was repeated except that Polymer 2 was used instead of Polymer 1.

Example 3

A composition was prepared as follows: 76.65% by weight of Polymer 3 and 17.33% by weight of Polymer 5 were mixed together with the same carbon black masterbatch that was used in Example 1 in an amount of 5.75% by weight. Then 2100 ppm of Irganox 1330 and 190 ppm of Irganox E201 were still added. The resulting blend had an $MFR_5$ of 7.4 g/10 min and a density of 946 kg/m$^3$.

The compositions were compounded/melt homogenized in a Buss Co-Kneader MDK 46/E-11 L/D. Polymer and additives (pellets and/or powder) were fed into the first mixer inlet of the Buss Co-Kneader which is a mixer with a downstream discharge single screw extruder with a pelletizing unit cutting pellets in the molten stage and cooled via water. The mixer temperature was set to 140 to 165° C. from the first inlet to the outlet and the discharge extruder temperature was set to about 165° C. The mixer was operated at 170 rpm and the throughput was 100 kg/h.

The composition was then extruded to pipes as described in Example 1 except that during pipe extrusion, 5% by weight, based on the total amount of the composition, of a catalyst master batch was added containing 0.9% by weight, based on the total amount of the master batch, dioctyltinlaureate (DOTL). Cross-linking of the extruded pipes was subsequently performed by submerging the pipes in water bath with a temperature of 95° C. for 12 hours. The cross-linking degree (gel content) was measured to be 64.4%.

Example 4

A composition was prepared as follows: 45.4% by weight of Polymer 3, 29.0% of Polymer 4 and 25.0% of Polymer 6 were mixed. Into the mixture 3500 ppm of Irganox 1330, 2000 ppm of Irganox 1010 and 500 ppm of Irgafos 168 were added. The blend was compounded in the same way as described in Example 3. The resulting blend had an $MFR_5$ of 5 g/10 min and a density of 947 kg/m$^3$.

Then the composition was extruded into pipes and subsequently cross-linked as described in Example 3. The gel content was measured and found to be 65%.

TABLE 1

| Data on polymer compositions and pipes | | | | |
|---|---|---|---|---|
| Example | 1C | 2C | 3 | 4 |
| Polymer 1 amount, parts per hundred | 93.9 | — | — | — |
| Polymer 2 amount, parts per hundred | — | 93.7 | — | — |
| Polymer 3 amount, parts per hundred | — | — | 76.65 | 45.4 |
| Polymer 4 amount, parts per hundred | — | — | — | 29.0 |
| Polymer 5 amount, parts per hundred | — | — | 17.35 | — |
| Polymer 6 amount, parts per hundred | — | — | — | 25.0 |
| Calcium stearate, parts per million | 1500 | 1500 | — | — |
| Carbon black master batch, parts per hundred | 5.75 | 5.75 | 5.75 | — |
| (Carbon black in polymer, weight %) | (2.25) | (2.25) | (2.25) | |
| Irganox 1330, parts per million | 1600 | 3600 | 2100 | 3500 |
| Irganox E201, parts per million | 250 | 290 | 190 | — |
| Irganox 1010, parts per million | — | — | — | 2000 |
| Irgafos 168, parts per million | — | — | — | 500 |
| Total AO/stabilizer content, parts per million | 1850 | 3890 | 2290 | 6000 |
| $MFR_5$, g/10 min | 0.88 | 0.83 | 7.4 | 5.0 |
| $MFR_{21}$, g/10 min | 22 | 22 | | |
| $FRR_{21/5}$ | 25 | 27 | | |
| Density, kg/m$^3$ | 952 | 952 | 946 | 947 |
| Average lifetime at 90° C. 1 ppm $ClO_2$, hours | 1693 | 2024 | 7769 | 10827[1] |

[1] Test was interrupted at no break after 10827 hours

The comparison of Examples 10 with 3 and 2C with 4 shows that the pipes made from the compositions according to the present invention have significantly increased resistance to those made of prior art materials. Furthermore, Example 3 shows that by using a low level of stabilization a long lifetime in $ClO_2$-containing water at 90° C. was obtained, about three to four times as long as for Comparative Examples 1 and 2. Such materials are suitable for use in drinking water pipes where the operating temperature usually is less than about 25° C. and where the migration of additives into the water needs to be low.

The invention claimed is:

1. A method of transporting water at elevated pressure of from 1.5 to 10 bar (a) from a water delivery station to at least one consumer station through at least one pipeline connecting said delivery station to said consumer station, said pipeline comprising a number of pipe elements having an inner surface and an outer surface wherein said inner surface defines a flow path for water, said method comprising the steps of:
   disinfecting water by dosing chlorine dioxide into the water in an amount of from 0.01 ppm to 4 ppm by weight of $ClO_2$ in water;
   establishing a flow of the disinfected water from said delivery station to said at least one consumer station through said pipeline,
   characterized in that at least one pipe element in said pipeline has an internal layer which is in contact with water disinfected by chlorine dioxide, the internal layer consisting essentially of:
   (i) 60% or greater by weight of cross-linked polyethylene which has been produced by cross-linking a cross linkable ethylene polymer having a $MFR_5$ of from 1 to 10 g/10 min, wherein said cross linkable ethylene polymer is a copolymer of ethylene comprising from 95 to 99.9% by mole of ethylene units and from 0.1 to 5% by mol of vinylsilane units and which has been cross-linked to a cross-linking degree of at least 60%, wherein the cross-linking degree was determined according to ASTM D2765-01 method A by using decalin as solvent;
   (ii) from 1000 to 3000 ppm by weight of at least one antioxidant or stabilizer selected from the group consisting of sterically hindered phenols, phosphites, phosphonites, sulphur-containing antioxidants, and nitrogen-containing antioxidants;
   (iii) optionally an additional ethylene polymer; and
   (iv) optionally at least one additive selected from the group consisting of pigments and UV screeners.

2. The method according to claim 1, wherein the at least one antioxidant or stabilizer is selected from the group consisting of 2,6-di-tert-butyl-4-methyl phenol, pentaerythrityl-tetrakis(3-(3',5'-di-tert. butyl-4-hydroxyphenyl)-propionate, octadecyl-3-(3'S'-di-tert-butyl-4'-hydroxyphenyl)propionate, 1,3,5-tri-methyl-2,4,6-tris-(3,5-di-tert. butyl-4-hydroxyphenyl)benzene, 2,5,7,8-tetramethyl-2(4',8',12'-trimethyltridecyl)chroman-6-ol, calcium (3,5-di-tert. butyl-4-hydroxy benzyl monoethyl-phosphonate), 1,3,5-Tris(3',5'-di-tert. butyl-4'-hydroxybenzyl)-isocyanurate, bis-(3,3-bis-(4-'-hydroxy-3'-tert. butylphenyl)butanic acid)-glycolester, 4,4'-thiobis (2-tert. butyl-5-methylphenol), 2,2'-metilene-bis(6-(1-methyl-cyclohexyl) para-cresol), N,N'-hexamethylene bis (3,5-di-tert. butyl-4-hydroxy-hydrocinnamamide, 1,1,3-tris (2-methyl-4-hydroxy-5-tert. butylphenyl)butane, 1,3,5-tris (4-tert. butyl-3-hydroxy-2,6-dimethylbenzyl)-1,3,5-triazine-2,4,6-(1H,3H,5H)-trione, 2,2'-thiodiethylene-bis-(3,5,di-t-butyl-4-hydroxyphenyl)propionate, diethyl((3,5-bis-(1,1-dimethylethyl)-4-hydroxyphenyl)methyl)phosphonate, N,N'-bis-(3-(3',5'-di-t-butyl-4'-hydroxyphenyl)propionyl) hydrazine, tris(2,4-di-t-butylphenyl) phosphite, tetrakis-(2,4-di-t-butylphenyl)-4,4'-biphenylen-di-phosphonite, tris-(nonylphenyl)phosphite, dilaurylthiodipropionate, ditridecylthiodipropionate, dimyristylthiodipropionate, dioctadecyldisulphide, bis[2-methyl-4-(3-n-dodecylthiopropionyloxy)-5-tert-butylphenyl]sulfide, pentaerythritol-tetrakis-(3-laurylthiopropionate), 3,3'-thiobispropanoic acid dimethylester polymer with 1,4-cyclohexanedimethanol, octadecyl ester, distearylthiodipropionate, 4,4'-bis(1,1'-dimethylbenzyl)diphenylamine, 2,2,4-trimethyl-1,2-dihydroquinoline, p-(p-toluene-sulfonylamido)-diphenylamine, N,N'-diphenyl-p-phenylene-diamine, N,N'-dinaphtyl-p-phenylene-diamine, and p,p'-dioctyldiphenylamine.

3. The method according to claim 1, wherein the at least one antioxidant or stabilizer is selected from the group consisting of 2,6-di-tert-butyl-4-methyl phenol, dioctadecyldisulphide, 4,4'-bis(1,1'-dimethylbenzyl)diphenylamine, 2,2,4-trimethyl-1,2-dihydroquinoline, N,N'-diphenyl-p-phenylene-diamine, N,N'-dinaphtyl-p-phenylene-diamine, and p,p'-dioctyldiphenylamine.

4. A method for transporting water into which chlorine dioxide has been added, comprising utilizing a pipe to transport the water,
wherein the pipe has a layer forming an inner pipe surface defining a flow path for the water within said pipe, and wherein said layer consists of a composition comprising:
(i) from 60% or greater by weight of cross-linked polyethylene and the cross-linked polyethylene is produced by cross-linking a cross-linkable ethylene polymer having a $MFR_5$ of from 1 to 10 g/10 min, wherein said cross linkable ethylene polymer is a copolymer of ethylene comprising from 95 to 99.9% by mole of ethylene units and from 0.1 to 5% by mol of vinylsilane units;
(ii) a total of from 1000 to 3000 ppm by weight of additives, wherein the composition contains only additives selected from the group consisting of sterically hindered phenols, phosphites, phosphonites, sulphur-containing antioxidants, nitrogen-containing antioxidants and mixtures thereof.

5. The method according to claim 4 for transporting water which has been disinfected by dosing into the water from 0.01 to 4 ppm $ClO_2$.

6. The method according to claim 4, wherein the water is drinking water.

7. The method according to claim 5 wherein the water has been disinfected by dosing into the water from 0.01 to 2 ppm $ClO_2$.

8. The method according to claim 4 wherein said layer forming an inner pipe surface is produced by a process comprising the steps of:
providing a cross-linkable ethylene polymer having a density of from 925 to 965 kg/m³ and a melt index $MFR_5$ of from 1 to 10 g/10 min and a melt index $MFR_2$ of from 0.1 to 10 g/10 min to form a cross-linkable composition;
extruding said cross-linkable composition to produce a pipe;
treating said extruded article in conditions where said first polymer cross-links; and
recovering said cross-linked polyethylene pipe.

9. The method according to claim 8 comprising the additional steps of
forming a pipeline from said cross-linked polyethylene pipe;
providing a mixture of chlorine dioxide and water; and
establishing a flow of said mixture of water and chlorine dioxide within the flow path of said pipeline.

10. The method according to claim 8 characterized in that said cross-linkable ethylene polymer is a copolymer of ethylene comprising from 93 to 99.9% by mole of ethylene units and from 0.1 to 7% by mole of units derived from a non-conjugated polyene.

11. The method according to claim 10 wherein the non-conjugated diene is selected from the group consisting of 1,7-octadiene, 1,9-decadiene, 1,11-dodecadiene and 7-methyl-1,6octadiene.

12. The method according to claim 4 wherein the cross-linkable ethylene polymer is combined with a silane condensation catalyst and the cross-linking is achieved by contacting the composition with water, water vapor or steam.

13. The method according to claim 4 wherein the cross-linked polyethylene has been cross-linked to a cross-linking degree of at least 60%, wherein the cross-linking degree was determined according to ASTM D2765-01 method A by using decalin as solvent.

14. The method according to claim 4, wherein the at least one antioxidant or stabilizer is selected from the group consisting of 2,6-di-tert-butyl-4-methyl phenol, pentaerythrityl-tetrakis(3-(3',5'-di-tert. butyl-4-hydroxyphenyl)-propionate, octadecyl-3-(3'S'-di-tert-butyl-4'-hydroxyphenyl)propionate, 1,3,5-tri-methyl-2,4,6-tris-(3,5-di-tert. butyl-4-hydroxyphenyl)benzene, 2,5,7,8-tetramethyl-2(4',8',12'-trimethyltridecyl)chroman-6-ol, calcium (3,5-di-tert. butyl-4-hydroxy benzyl monoethyl-phosphonate), 1,3,5-Tris(3',5'-di-tert. butyl-4'-hydroxybenzyl)-isocyanurate, bis-(3,3-bis-(4-'-hydroxy-3'-tert. butylphenyl)butanic acid)-glycolester, 4,4'-thiobis (2-tert. butyl-5-methylphenol), 2,2'-metilene-bis(6-(1-methyl-cyclohexyl) para-cresol), N,N'-hexamethylene bis (3,5-di-tert. butyl-4-hydroxy-hydrocinnamamide, 1,1,3-tris (2-methyl-4-hydroxy-5-tert. butylphenyl)butane, 1,3,5-tris (4-tert. butyl-3-hydroxy-2,6-dimethylbenzyl)-1,3,5-triazine-2,4,6-(1H,3H,5H)-trione, 2,2'-thiodiethylene-bis-(3,5,di-t-butyl-4-hydroxyphenyl)propionate, diethyl((3,5-bis-(1,1-dimethylethyl)-4-hydroxypheny)methyl)phosphonate, N,N'-bis-(3-(3',5'-di-t-butyl-4'-hydroxyphenyl)propionyl) hydrazine, tris(2,4-di-t-butylphenyl)phosphite, tetrakis-(2,4-di-t-butylphenyl)-4,4'-biphenylen-di-phosphonite, tris-(nonylphenyl)phosphite, dilaurylthiodipropionate, ditridecylthiodipropionate, dimyristylthiodipropionate, dioctadecyldisulphide, bis[2-methyl-4-(3-n-dodecylthiopropionyloxy)-5-tert-butylphenyl]sulfide, pentaerythritol-tetrakis-(3-laurylthiopropionate), 3,3'-thiobispropanoic acid dimethylester polymer with 1,4-cyclohexanedimethanol, octadecyl ester, distearylthiodipropionate, 4,4'-bis(1,1'-dimethylbenzyl)diphenylamine, 2,2,4-trimethyl-1,2-dihydroquinoline, p-(p-toluene-sulfonylamido)-diphenylamine, N,N'-diphenyl-p-phenylene-diamine, N,N'-dinaphtyl-p-phenylene-diamine, and p,p'-dioctyldiphenylamine.

15. The method according to claim 4, wherein the at least one antioxidant or stabilizer is selected from the group consisting of 2,6-di-tert-butyl-4-methyl phenol, dioctadecyldisulphide, 4,4'-bis(1,1'-dimethylbenzyl)diphenylamine, 2,2,4-trimethyl-1,2-dihydroquinoline, N,N'-diphenyl-p-phenylene-diamine, N,N'-dinaphtyl-p-phenylene-diamine, and p,p'-dioctyldiphenylamine.

16. A method for transporting chemicals used in processes in pulp and paper industry, textile industry and printing industry comprising utilizing a pipe having a layer forming an inner pipe surface defining a flow path for a fluid within said pipe wherein said layer consists of a composition consisting essentially of:
(i) 60% or greater by weight of cross-linked polyethylene and the cross-linked polyethylene is produced by cross-linking a cross-linkable ethylene polymer having a $MFR_5$ of from 1 to 10 g/10 min, wherein said cross linkable ethylene polymer is a copolymer of ethylene comprising from 95 to 99.9% by mole of ethylene units and from 0.1 to 5% by mol of vinylsilane units,
(ii) from 1000 to 3000 ppm by weight of at least one antioxidant or stabilizer selected from the group consisting of sterically hindered phenols, phosphites, phosphonites, sulphur-containing antioxidants, and nitrogen-containing antioxidants;
(iii) optionally an additional ethylene polymer; and
(iv) optionally at least one additive selected from the group consisting of pigments and UV screeners.

17. The method according to claim 16, wherein the at least one antioxidant or stabilizer is selected from the group consisting of 2,6-di-tert-butyl-4-methyl phenol, pentaerythrityl-tetrakis(3-(3',5'-di-tert. butyl-4-hydroxyphenyl)-propionate, octadecyl-3-(3'S'-di-tert-butyl-4'-hydroxyphenyl)propionate, 1,3,5-tri-methyl-2,4,6-tris-(3,5-di-tert. butyl-4-hydroxyphenyl)benzene, 2,5,7,8-tetramethyl-2(4',8',12'-trimethyltridecyl)chroman-6-ol, calcium (3,5-di-tert. butyl-4-hydroxy benzyl monoethyl-phosphonate), 1,3,5-Tris(3',5'-di-tert. butyl-4'-hydroxybenzyl)-isocyanurate, bis-(3,3-bis-(4-'-hydroxy-3'-tert. butylphenyl)butanic acid)-glycolester, 4,4'-thiobis (2-tert. butyl-5-methylphenol), 2,2'-metilene-bis(6-(1-methyl-cyclohexyl) para-cresol), N,N'-hexamethylene bis (3,5-di-tert. butyl-4-hydroxy-hydrocinnamamide, 1,1,3-tris (2-methyl-4-hydroxy-5-tert. butylphenyl)butane, 1,3,5-tris (4-tert. butyl-3-hydroxy-2,6-dimethylbenzyl)-1,3,5-triazine-2,4,6-(1H,3H,5H)-trione, 2,2'-thiodiethylene-bis-(3,5,di-t-butyl-4-hydroxyphenyl)propionate, diethyl((3,5-bis-(1,1-dimethylethyl)-4-hydroxyphenyl)methyl)phosphonate, N,N'-bis-(3-(3',5'-di-t-butyl-4'-hydroxyphenyl)propionyl) hydrazine, tris(2,4-di-t-butylphenyl) phosphite, tetrakis-(2,4-di-t-butylphenyl)-4,4'-biphenylen-di-phosphonite, tris-(nonylphenyl)phosphite, dilaurylthiodipropionate, ditridecylthiodipropionate, dimyristylthiodipropionate, dioctadecyldisulphide, bis[2-methyl-4-(3-n-dodecylthiopropionyloxy)-5-tert-butylphenyl]sulfide, pentaerythritol-tetrakis-(3-laurylthiopropionate), 3,3'-thiobispropanoic acid dimethylester polymer with 1,4-cyclohexanedimethanol, octadecyl ester, distearylthiodipropionate, 4,4'-bis(1,1'-dimethylbenzyl)diphenylamine, 2,2,4-trimethyl-1,2-dihydroquinoline, p-(p-toluene-sulfonylamido)-diphenylamine, N,N'-diphenyl-p-phenylene-diamine, N,N'-dinaphtyl-p-phenylene-diamine, and p,p'-dioctyldiphenylamine.

\* \* \* \* \*